Figure 1:
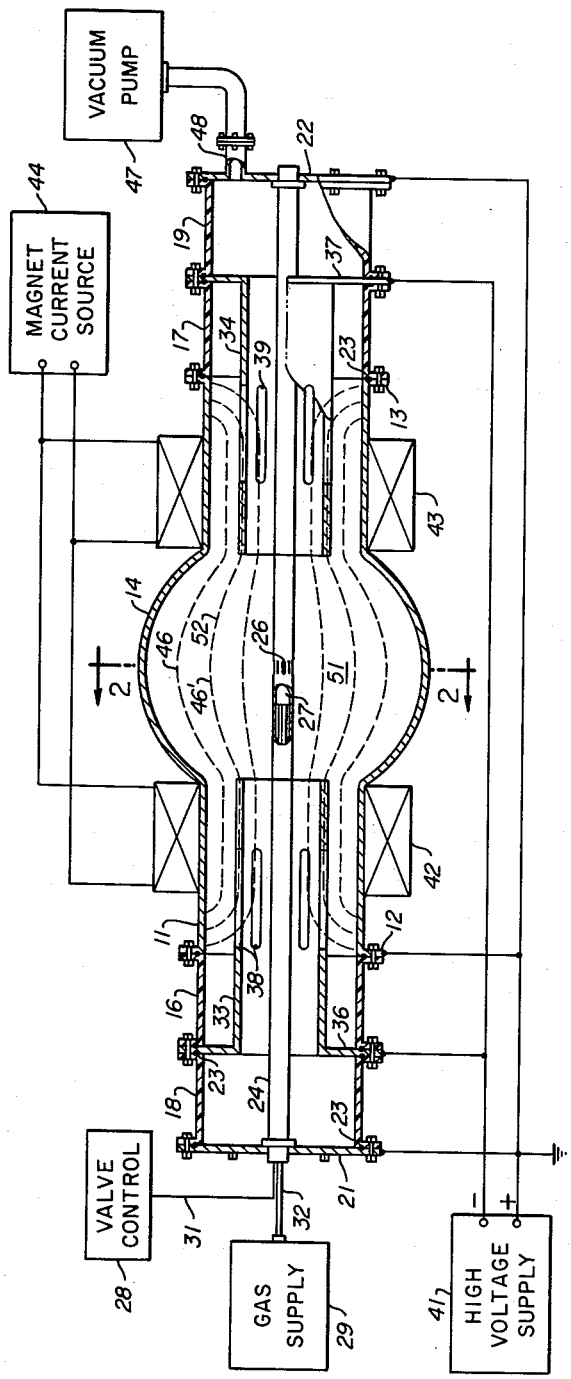

May 12, 1964

W. R. BAKER ETAL 3,132,996

CONTRA-ROTATING PLASMA SYSTEM

Filed Dec. 10, 1962

2 Sheets-Sheet 1

INVENTORS
WILLIAM R. BAKER
BY KLAUS HALBACH

ATTORNEY

INVENTORS
WILLIAM R. BAKER
KLAUS HALBACH
BY
ATTORNEY

# United States Patent Office 3,132,996
Patented May 12, 1964

3,132,996
CONTRA-ROTATING PLASMA SYSTEM
William R. Baker, Orinda, and Klaus Halbach, Berkeley, Calif., assignors to the United States of America as represented by the United States Atomic Energy Commission
Filed Dec. 10, 1962, Ser. No. 243,683
14 Claims. (Cl. 176—7)

The present invention relates generally to magnetohydrodynamic devices and more particularly to apparatus for forming, containing and heating an ion-electron plasma under conditions productive of a high rate of nuclear interactions therein.

The objective of many plasma heating devices is to impart sufficient relative velocity to the ions in the plasma that collisions among ions will cause fusion reactions. Such fusion reactions release energy in various forms, of which energetic neutrons are the most readily utilized at the present stage of development.

This invention provides a new means for producing a hot plasma by rotating the inner and outer portions of a plasma body in opposite directions, ions at the interface between the portions having very high relative velocities.

The invention has a cylindrical housing with coaxial magnetic mirror coils for producing an axially directed magnetic mirror field therein. A radial electric field is provided, the inner portion of the electric field being directed outwardly from the axis of the machine and the outer portion being directed radially inward from the housing. The electric fields thus meet at an annular region approximately halfway between the axis and the housing. This interface where the oppositely directed electric fields meet will be herein called the heating region. Ions in the outer portion of the plasma chamber are drawn inwardly by the electrical field while ions in the inner portion of the plasma chamber of the machine are accelerated outwardly. Owing to the axial magnetic field, the ions follow an azimuthal path around the axis of the machine while simultaneously exhibiting a cycloidal motion. The ions in the inner and outer portions are deflected in opposite directions so that an ion from the outer portion of the machine and one from the inner portion travel in opposite directions in the heating region. Furthermore, the maximum velocity that the ions which pass into the heating region will develop is attained in the heating region. Some of the ions collide and various interactions, including nuclear fusion reactions, occur. The relative velocity of the ions is increased several times over that of the usual rotating plasma devices where the direction of rotation is the same throughout the plasma. Thus, in the present invention the heating effect is increased and the probability that fusion reactions will occur between ions is greatly enhanced.

In rotational plasma apparatus such as the present invention, the plasma particles have individual cuspate orbits within the plasma body and the entire plasma body may continue to rotate after burn-out, which occurs when all the neutral gas particles are ionized. No additional Larmor energy can be gained by the plasma particles from a D.C. electric field after burn-out. Accordingly, in conventional plasma apparatus the electric field may be eliminated after burn-out. While elimination of the electric field causes the individual particle orbits to change from a cuspate configuration to a circular configuration, no loss in plasma temperature occurs because of such change. The velocity of the particles does not vary in the circular orbit as it does in the cycloidal orbit. In the present invention, by contrast, it is desirable that the electric field be retained to preserve the cuspate orbits for a relatively long time, since the portion of the cuspate orbit where the velocity is highest occurs in the heating region. If the particles were permitted to go into a circular orbit, the particles in the heating region would have a steady-state average velocity much below the peak velocity, consequently decreasing the heating rate and the rate of particle reactions. In the present invention, if the electric field is retained for a sufficiently long time, the high relative energy of the particles in the high velocity portion of the cuspate orbits is thermalized or randomized through collisions. Such thermal energy can then be retained if the electric field is subsequently removed.

The present invention belongs to the class of plasma devices wherein the purity of the plasma is maintained by releasing the un-ionized gas through a fast-acting valve at a central point within the plasma chamber in a manner similar to that described in U.S. Patent No. 3,021,272 issued February 13, 1962 for "Plasma Heating and Confining Device." Alternate valve structures of this type are described in copending U.S. patent applications Serial No. 112,132 for "Counter-Rotating Plasma Device" filed May 23, 1961, now Patent 3,096,269, and Serial No. 225,169 for "Plasma Propulsion Device" filed September 20, 1962.

In this class of plasma device the neutral gas is released through the fast operating valve at a point remote from the insulators, which are necessarily present if an electric field is to be provided. The gas is ionized, contained, and heated before gas diffusion to the insulators can occur. The maximum plasma heating obtainable is enchanced by such a procedure since, if contact of the hot plasma with the insulators should occur, not only are impurities eroded from the insulators which inhibit further plasma heating, but a higher electric field can be held across the plasma when there is no plasma-insulator contact. By maintaining a pure plasma, as in the present invention, a higher plasma velocity and temperature is obtained and the containment time is lengthened.

A further important advantage of this class of device is that the electric and magnetic fields are present either at the time the neutral gas is admitted into the plasma chamber or shortly thereafter. Since the full intensity of electric field is present during the period when the gas is ionized, the Larmor radius of the particle orbits is larger than it would be in conventional apparatus where ionization occurs during the time the electric field is being created and has not yet attained full intensity. Ideally, the plasma body will have an energy in rotational velocity at burn-out defined by the ratio of electric and magnetic fields, $E/B$, and an equivalent energy in random phase Larmor motion (or heat) of the ions. The stability of the plasma is improved if the ion Larmor radius is large, as discussed by Rosenbluth, Krall and Rostoker in Nuclear Fusion, Supplement 143–50 (1962) (GA–2371). Thus the plasma stability in the class of device including the present invention is improved over other types of plasma device.

Therefore, it is an object of the present invention to provide a more efficient apparatus for heating an ion-electron plasma to high temperatures.

It is another object of the present invention to provide structure for utilizing the high mobility of plasma particles along magnetic field lines to extend the effect of remote electrodes so that a reversal of electric field direction can be obtained in electrode free regions.

It is an object of the present invention to provide means for enhancing the rate at which high velocity particle collisions occur in a plasma.

It is another object of the present invention to provide a means for rotating the outer portion of a plasma body in one direction while rotating the inner portion in the opposite direction to enhance interactions between plasma particles at the interface.

It is yet another object of the present invention to provide a means for accelerating bodies of ions to high oppositely directed velocities without the use of electrodes in close proximity to the ions.

Figure 2:
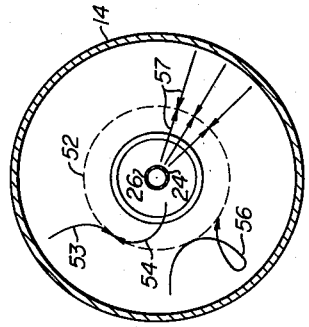
Figure 2:
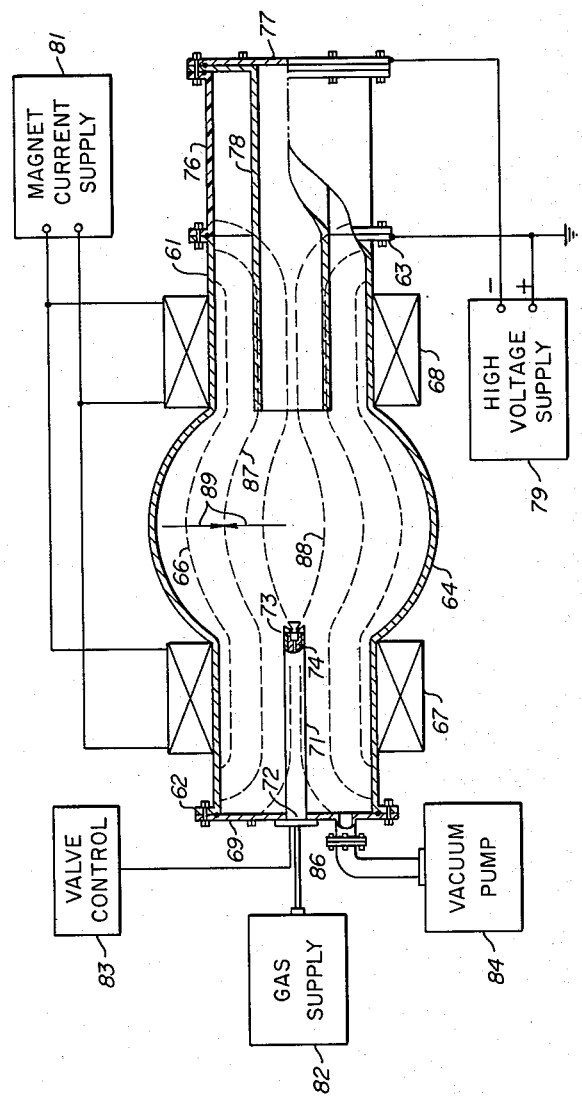

The invention, together with further objects and advantages thereof, will be better understood by reference to the following specification in conjunction with the accompanying drawings of which:

FIGURE 1 is a longitudinal section view taken along the axis of a magnetohydrodynamic device, FIGURE 2 is a cross-sectional view of the plasma heating region in the apparatus of FIGURE 1 taken at line 2—2 thereof, and FIGURE 3 is a broken out view of a second embodiment of the invention.

Referring now to FIGURES 1 and 2 in conjunction, there is shown an electrically conductive cylindrical housing 11, which functions as an outer electrode, having flanges 12 and 13 at opposite ends and having an enlarged central portion 14. Cylindrical insulators 16, 17, 18 and 19 have the same diameter as housing 11 and are each flanged at both ends. The insulators 16 and 17 are secured coaxially to each end of housing 11. The cylindrical insulators 18 and 19 are similarly secured to the flanged insulators 16 and 17, the insulators forming an extension of the chamber defined by the housing 11. A pair of conductive closure discs 21 and 22 are secured to the outer flanges of insulators 18 and 19 respectively. O-ring seals 23 are provided at the various junctures between the described elements, thus forming a gas tight chamber within housing 11.

A long tubular center electrode 24 is disposed along the axis of housing 11 between closure discs 21 and 22 and is secured thereto. At the center of the electrode 24, a plurality of apertures 26 are provided, in an annular band therearound, for the injection of gas into housing 11. A very rapidly acting valve 27, which may be of the type described in copending application S.N. 112,132 hereinbefore identified, is disposed within the axial electrode 24 at the apertures 26. Such valve 27 releases a metered quantity of gas through the apertures 26 in a very short burst or puff. The valve 27 is electrically controlled, as described in the above identified copending application, by a control 28 while a gas supply 29 provides a suitable gas or mixture of gases to the valve. Deuterium and tritium are examples of suitable fuel gases. Both the control 28 and gas supply 29 are disposed outside the housing 11 and are connected with the valve 27 by conduits 31 and 32 respectively which pass through the end of the axial electrode 24.

A pair of cylindrical field electrodes 33 and 34 are disposed coaxially around the axial electrode 24, slightly closer to the axial electrode than to the housing 11, and are spaced apart symmetrically on each side of the apertures 26. The axial length of field electrodes 33 and 34 is not critical since only the facing portions of the electrodes are ordinarily utilized in the operation of the invention. The outermost ends of the field electrodes 33 and 34 have flanges 36 and 37 secured between insulators 16 and 18 and between insulators 17 and 19 respectively, thus electrically isolating the field electrodes from the housing 11 and the axial electrode 24. A plurality of long, longitudinal slots 38 and 39 are formed along the central portions of each of the field electrodes 33 and 34 respectively, the slots being spaced around the circumference thereof. The negative potential terminal of a high voltage source 41 is connected to the field electrodes 33 and 34 while the positive terminal of the source is connected to the housing 11 and the closure discs 21 and 22. Thus the field electrodes 33 and 34 are at a negative potential with respect to the housing 11 and axial electrode 24.

A pair of spaced apart magnet coils 42 and 43 are disposed coaxially around the housing 11 approximately at the longitudinal positions of the field electrodes 33 and 34 respectively. A magnet current source 44 is connected to the coils 42 and 43 to provide for similarly directed magnetic fields in each coil. Owing to the spacing of the coils, a magnetic mirror type field is provided at the central region of the housing, the general shape of the magnetic field within the housing being indicated in FIGURE 1 by flux lines 46. The configuration of the enlarged portion 14 of the housing 11, in general, conforms to the shape of the magnetic mirror field. The flux surface or magnetic tube of flux is preferably parallel to the field electrodes 33 and 34 at each side of the magnetic mirror field. At outermost ends of the coils 42 and 43 the flux lines 46 curve outwardly and intersect with the housing 11, near the flanges 12 and 13. The long slots 38 and 39 are provided so that most of the flux lines 46 within region of the field electrodes 33 and 34 will not intersect such electrodes.

A vacuum pump 47 is coupled to a pumpout port 48 in the closure disc 22 so that all gases may be removed from the housing 11 prior to operation.

The two ends of the invention are essentially mirror images around a transverse plane passed through the middle of the apertures 26 in the axial electrode 24. For purposes of explanation, the annular space between the facing ends of the field electrodes 33 and 34 and between the housing 11 and electrode 24 will be designated the containment region 51. An annular heating region 52 is defined as the portion of the containment region 51 which lies on or is adjacent the surface of revolution of a particular magnetic line 46' which passes through the facing annular end surfaces of field electrodes 33 and 34. The heating region 52 is the location of the interface between the two oppositely rotating bodies which are formed during operation of the invention.

The plasma heating region 52 is at the same potential as the field electrodes 33 and 34 since the ions and electrodes have very high mobility along the magnetic field within the containment region 51. If a different electric charge should tend to develop at any point on the particular magnetic field line 46' (plasma heating region 52) that passes through the ends of the field electrodes 33 and 34, plasma particles having the opposite charge immediately flow toward such point from the electrodes and the charge is negated. Thus the heating region 52 functions as a virtual electrode and charged particles are affected thereby in substantially the same way that particles are affected by a metallic electrode. Since there is only a limited particle mobility along field lines through magnetic mirrors, magnetic lines which intersect any conductors disposed outside the containment region 51 do not readily carry the potential of such conductors to the inside of the region 51.

Considering now the operation of the device, assume that air in the interior of the housing 11 is evacuated by the pump 47, that the magnet coils 42 and 43 are energized to create the magnetic mirror field 46, and that the high voltage source 41 is energized. An outer electric field is created inwardly from the housing 11 toward the field electrodes 33 and 34 while an inner field is formed in the opposite direction outwardly from the electrode 24 to the field electrodes as indicated by arrows 57 in FIGURE 2. Owing to the presence of a virtual electrode as described above, the plasma heating region 52 is the region where the electric field is zero, or in other terms, where the electric field direction reverses.

The supply 29 provides gas to the valve 27 which is then rapidly opened by activation of valve control 28. The neutral gas passes outwardly through the apertures 26 in a burst or puff and diffuses outwardly from the apertures 26. As soon as neutral gas particles diffuse to the vicinity of the field electrodes 33 and 34 and to the housing 11, breakdown immediately occurs from the field electrodes to both the axial electrode 24 and housing 11, ionizing nearly all the gas particles in the containment region 51. Since there is a negative potential applied to the field electrodes 33 and 34, the positive ions are accelerated along the electric field lines toward the plasma heating region 52, but owing to the magnetic field 46, the ions are deflected into cuspate orbits. Typical ion paths are shown in FIGURE 2, the path of a first ion 53 which originates near the housing 11 is shown curving in one direction while the path of a second ion 54 which originates near the electrode 24 curves in the opposite direction. If, during the first passage through the heating region 52, no collision or near collision occurs, an ion would typically have a path 56, the ion starting from zero velocity and following a somewhat cycloidal path while moving around the axis of the apparatus and simultaneously moving towards the median transverse plane thereof owing to the magnetic mirror effect. The ion 56 has maximum velocity at plasma heating region 52 where it is at the portion of the orbit nearest the electrode 24 and has passed through the maximum amount of electric field. If no ion collision occurs, the ion continues the substantially cycloidal motion, turning outwardly toward housing 11 and gradually decelerating until it reverses direction and again accelerates back toward the plasma heating region 52. The ion will continue orbiting in the described manner until a collision occurs.

The individual cycloidal orbits of both the ions and electrons cause a general rotation of the plasma around the axial electrode 24, the annular plasma body outside the plasma heating region 52 rotating in one direction and the plasma body on the inside rotating in the opposite direction. Since the ions 53 and 54 are traveling in opposite directions at the plasma heating region 52 and as each ion has its maximum velocity when in such region, an increase is obtained which, for the same electric and magnetic fields, may typically be up to four times the heating effect of conventional rotating plasma devices.

Since the cycloidal orbit of an ion has a much greater radius than the orbit of an electron, space charges are produced within the plasma both near the axial electrode 24 and near the housing 11. The ions are deflected toward the heating region 52 more than are the electrons, thus leaving a net electrical charge caused by the excess of electrons remaining near the positive electrodes (housing 11 and electrode 24). The voltage drop across such space charge region is in opposition to the potential applied by the high voltage source 41 and is therefore undesirable since it reduces the electric field intensity across the plasma. In the present invention, the major portion of the excess electrons can be removed to eliminate this opposition potential. Electrons are much more mobile along magnetic field lines than are ions, therefore, the mutual repulsion of excess electrons is sufficient to cause the electrons to flow through the magnetic mirrors and along the magnetic lines to the region where such lines intersect the housing 11. It is necessary that the electrons flow along magnetic lines to a positive electrode such as the housing 11, hence the slots 38 and 39 are provided in the field electrodes 33 and 34 so that the electrons along the axial electrode 24, which are repelled by the negative charge on the field electrodes, can pass through the slots to the positive housing 11. Thus the space charge at the axial electrode 24 and that at the housing 11 is dissipated and the full potential of the high voltage source 41 is applied across the plasma to enhance the operation of the device.

In a typical contra-rotating plasma system of the type herein described the electric field may be formed by a 50 kilovolt potential from the high voltage source 41 while the magnetic field intensity is approximately 30 kilogauss in the central containment region 51. The overall length of the housing 11 together with insulators 16, 17, 18 and 19 is five feet and the housing has a diameter of nine inches. The axial electrode 24 has a diameter of one inch while the field electrodes 33 and 34 have a diameter of three inches. The use of more intense electric and magnetic fields requires corresponding increases in the dimensions.

It may be desired in some instances to simplify the above described apparatus by eliminating one of the field electrodes and a portion of the axial electrode. This is possible since as described above, a magnetic line in a containment region which passes through an electrode in such region will provide a virtual electrode along the magnetic line if plasma is present to conduct current.

Referring now to FIGURE 3, there is shown a modified device having the simplified structure. Except as will be herein described, the structure and mode of operation of the apparatus of FIGURE 3 is essentially similar to that of FIGURE 1. The apparatus comprises a cylindrical conductive housing 61 having outwardly projecting flanges 62 and 63 on each end. An enlarged central portion 64 on the housing 61 conforms to the curvilinear contour of the magnetic field 66 which is provided by a pair of field coils 67 and 68 disposed coaxially around the housing 61 on each side of the enlarged portion 64. A flat conductive closure disc 69 is secured to flange 62 of housing 61. One end 72 of a long, slender, tubular electrode 71 is secured to disc 69 while the other end 73 projects a short distance into the enlarged portion 64 of the housing along the axis thereof. A rapid acting valve 74 is disposed within end 73 of the electrode 71, the valve having the structure hereinbefore identified. The electrode end 73 is partly open so that gas released from the valve 74 is distributed throughout the space within the enlarged portion 64.

A terminally flanged cylindrical insulator 76 is secured to flange 63 of housing 61 in coaxial relationship thereto, to isolate the housing electrically from a flat conductive disc 77 which closes the open end of the insulator 76. A long cylindrical, conductive field electrode 78 is secured to the closure disc 77 and projects along the axis of housing 61 into the enlarged portion 64 opposite the axial electrode 71. The field electrode has a diameter intermediate between that of the housing 61 and the axial electrode 71.

As in the previously described embodiment, a direct current high voltage supply 79 is connected from the closure disc 77 to the housing 61, with the negative potential applied to the disc. A magnet current supply 81 is connected to the magnet coils 67 and 68 to provide the magnetic mirror field. A gas supply 82 is connected through the axial electrode 71 to the valve 74 which is actuated by a valve control 83. A vacuum pump 84 is coupled to a port 86 in the closure disc 69.

The operation of the apparatus of FIGURE 3 is essentially similar to that of FIGURE 1. Neutral gas is emitted from the end 73 of the axial electrode 71 by operation of valve 74. A discharge occurs through the gas and the resultant ions are accelerated toward a plasma heating region formed along the annular magnetic flux tube surface 87 which intersects the annular end surface of field electrode 78. The electric field, indicated by arrows 89, is directed toward the heating region 87 from both the housing 61 and from the magnetic flux region 88 which extends along the axis of the apparatus which flux intersects the axial electrode 71. The region occupied by the magnetic flux 88 is at the same potential as the axial electrode 71 and functions effectively as an extension thereof in the same manner that the magnetic flux tube surface 66 in plasma heating region 87 extends the effect of field electrode 78. The combination of electric and magnetic fields does not differ significantly from that described previously with regard to FIGURES 1 and 2 and a similar plasma heating effect is obtained.

Many of the aspects of the two described embodiments of the invention can be combined in various ways. The axial electrode 71 as employed in the apparatus of FIGURE 3 may be utilized with a pair of field electrodes 33 and 34 as employed with the first embodiment for example.

Thus while the invention has been disclosed with respect to certain exemplary embodiments, it will be apparent to those skilled in the art that numerous variations and modifications may be made within the spirit and scope of the invention and it is not intended to limit the invention except as defined in the following claims.

What is claimed is:

1. In a magnetoyhdrodynamic apparatus, the combination comprising:
   (a) an annular outer electrode,
   (b) means providing a magnetic field within said outer electrode which field is symmetric about an axis extending longitudinally through said outer electrode and which forms a plasma trapping region therein,
   (c) a central electrode disposed within said outer electrode substantially at said axis and projecting into said plasma trapping region,
   (d) an annular field electrode disposed within said outer electrode and encircling said axis in spaced apart relation to said central electrode and said outer electrode,
   (e) a high voltage source applying a negative potential to said field electrode relative to that of said outer electrode and said central electrode,
   (f) means for admitting gas to said plasma trapping region and,
   (g) means providing for a substantial degree of vacuum within said plasma trapping region.

2. In a magnetohydrodynamic device for ionizing a gas and for heating the resulting plasma, the combination comprising:
   (a) an electrically conducting annular outer electrode,
   (b) means creating a magnetic field which field has a plasma trapping configuration at a region within said outer electrode,
   (c) a center electrode extending into said plasma trapping region,
   (d) at least one annular field electrode projecting into said plasma trapping region at a radial position which is intermediate between said outer electrode and said center electrode,
   (e) a source of electrical potential applying a first potential to said outer electrode and said center electrode and applying a second relatively negative potential to said field electrode thereby creating oppositely directed electric fields from said field electrode to said outer electrode and from said field electrode to said center electrode, and
   (f) a valve for injecting gas into said magnetic field.

3. In a magnetohydrodynamic device for heating an ion-electron plasma to high temperatures, the combination comprising:
   (a) an annular outer electrode,
   (b) means creating a magnetic mirror field in said outer electrode which field has two regions of high intensity field separated by a region of lower intensity field and which is symmetrical about a longitudinal axis through said outer electrode,
   (c) a center electrode extending into said mirror field substantially at said axis thereof,
   (d) at least one annular field electrode encircling said axis of said magnetic field at a position intermediate between said center electrode and said outer electrode and extending a small distance into said mirror field,
   (e) means introducing a gas into the region of said mirror field,
   (f) a high voltage power supply having a positive voltage terminal connected to both said outer electrode and said center electrode and having a negative voltage terminal connected to said field electrode, and
   (g) means for hermetically sealing and evacuating the region of said mirror field.

4. In magnetohydrodynamic apparatus for generating and heating a plasma, the combination comprising:
   (a) a cylindrical electrically conductive outer electrode,
   (b) magnetic field producing means disposed adjacent said outer electrode and providing a magnetic mirror containment region therein,
   (c) a center electrode disposed at the axis of said outer electrode with at least a portion of said center electrode being disposed within said containment region,
   (d) at least one annular field electrode disposed coaxially within said outer electrode and to one side of the central portion of said containment region and having a diameter intermediate between that of said outer electrode and said center electrode,
   (e) an electrical power supply having a positive voltage terminal connected to both said outer electrode and said center electrode and having a negative voltage terminal connected to said field electrode,
   (f) means for hermetically sealing and evacuating said containment region, and
   (g) means for emitting gas into said containment region.

5. In apparatus for generating a high temperature ion-electron plasma, the combination comprising:
   (a) a long cylindrical outer electrode,
   (b) means producing a magnetic field having a plasma containment region within said outer electrode which field is symmetrical about the axis thereof,
   (c) a long center electrode disposed along the axis of said outer electrode and extending into at least one end of said containment region,
   (d) at least one annular field electrode disposed coaxially with respect to said center electrode at one end of said containment region and having a diameter intermediate between that of said outer electrode and that of said center electrode,
   (e) a rapidly opening valve disposed at the axis of said outer electrode for injecting gas into said containment region,
   (f) an electrical power source having a positive potential terminal coupled to both said outer electrode and said center electrode and having a negative potential terminal coupled to said field electrode, and
   (g) means for hermetically sealing and evacuating said containment region.

6. In a magnetohydrodynamic device for ionizing and heating a gas, the combination comprising:
   (a) a long cylindrical outer electrode,
   (b) a magnetic coil providing a magnetic mirror containment field within said outer electrode which field is symmetrical about the axis of said outer electrode,
   (c) a tubular central electrode disposed along said axis of said outer electrode and extending into said containment field therein,
   (d) at least one annular field electrode encircling said axis and having a diameter intermediate between that of said central electrode and that of said outer electrode, said field electrode being within a portion of mirror containment field which is spaced axially from the central region thereof,
   (e) an electrical power supply having a positive terminal connected to both said outer electrode and said central electrode and having a negative terminal connected to said field electrode,
   (f) means supplying gas to the region of said containment field through said central electrode, and
   (g) means for maintaining a substantial degree of vacuum in the region of said containment field.

7. In apparatus for ionizing and heating a gas the combination comprising:
   (a) a hermetically sealed cylindrical housing formed of electrically conductive material,
   (b) an annular magnetic coil disposed coaxially with respect to said housing and providing a plasma containment region therein of the magnetic mirror class,
(c) a tubular center electrode disposed along the axis of said housing and extending into at least one end of said plasma containment region,
(d) means for emitting gas into said plasma containment region,
(e) at least one annular field electrode disposed coaxially within said housing in said containment region and at a position spaced from the central portion thereof, said field electrode having a diameter intermediate between that of said housing and that of said center electrode,
(f) a source of electrical power having a positive voltage terminal coupled to both said housing and said center electrode and having a negative terminal coupled to said field electrode, and
(g) means for evacuating said housing.

8. Gas ionizing and heating apparatus as described in claim 7 wherein said gas emitting means (d) comprises a rapidly opening valve disposed within said center electrode (c) and wherein said center electrode is provided with at least one aperture for emitting said gas, said aperture being within said plasma containment region.

9. Gas ionizing and heating apparatus as described in claim 7 wherein said annular field electrode (e) is provided with longitudinal slots at a portion thereof outside said containment region of said magnetic mirror field whereby space charges formed around said center electrode (c) may be dissipated.

10. In apparatus for creating and heating a plasma, the combination comprising:
(a) an annular outer electrode,
(b) a magnetic field generating means producing a plasma containment magnetic mirror field within said outer electrode, the field being symmetrical about a longitudinal axis within said outer electrode and extending through said mirror field,
(c) a tublular center electrode disposed along said axis within said outer electrode and extending through said mirror field,
(d) at least one annular field electrode disposed within said magnetic mirror field and being spaced along said axis from the central region thereof, said field electrode encircling said center electrode and having a diameter intermediate between that of said outer electrode and said center electrode,
(e) a high voltage power supply applying a negative potential to said field electrode relative to that of said center and outer electrodes,
(f) means supplying gas to the region of said plasma containment field, and
(g) means maintaining a substantial degree of vacuum at said plasma containment region, 11. In a magnetohydrodynamic device for creating and heating a plasma, the combination comprising:
(a) a long cylindrical outer electrode,
(b) a magnet coil disposed coaxially with respect to said outer electrode and producing a magnetic mirror field therein,
(c) a tubular center electrode disposed along the axis of said housing and extending into said magnetic mirror field,
(d) a pair of annular field electrodes disposed within said outer electrode and encircling the axis thereof, said field electrodes being intermediate between said center electrode and said outer electrode and being spaced one on each side of the central region of said magnetic mirror field,
(e) a high voltage power supply having a positive voltage terminal connected to both said center electrode and said outer electrode and having a negative voltage terminal connected to said field electrodes,
(f) means for emitting gas into said magnetic mirror field between said field electrodes, and
(g) means for maintaining a substantial degree of vacuum in the region of said mirror field.

12. A magnetohydrodynamic device as described in claim 11 wherein said field electrodes are coaxial and intercept a common annular magnetic flux tube surface of said field.

13. In a magnetohydrodynamic device for creating and heating contra-rotating plasma bodies, the combination comprising:
(a) a long cylindrical outer electrode,
(b) a central tubular electrode disposed along the axis of said outer electrode and having an aperture at an intermediate longitudinal position,
(c) a pair of spaced apart annular field coils disposed coaxially around said outer electrode, one being on each side of said central electrode aperture, and being equally spaced therefrom,
(d) a magnet coil power supply coupled to said coils to provide for a similarly directed magnetic field through each coil whereby said coils form a magnetic mirror field centered on said aperture,
(e) a pair of annular field electrodes disposed coaxially with and intermediately between said outer electrode and said central electrode and having facing ends spaced equally on each side of said aperture,
(f) a high voltage power supply connected between said field electrodes and both said central electrode and said outer electrode,
(g) means for maintaining a substantial degree of vacuum in the region of said mirror field,
(h) a rapidly opening valve disposed within said central electrode and having an outlet communicated with said aperture, and
(i) a gas supply coupled to said valve through said central electrode.

14. In a magnetohydrodynamic device for creating and heating a contra-rotating plasma, the combination comprising:
(a) a cylindrical conductive outer electrode having a central portion of enlarged diameter relative to the terminal portions thereof,
(b) a pair of magnet coils disposed coaxially around said outer electrode with one on each side of said enlarged portion thereof,
(c) a magnet current supply coupled to said coils to provide a mirror type magnetic field within said enlarged portion of said outer electrode,
(d) a tubular center electrode disposed along the axis of said outer electrode and extending into said enlarged portion thereof.
(e) an annular field electrode disposed coaxially with respect to said outer electrode and said center electrode and having a radius intermediate between that of said center and outer electrodes, said field electrode being within said mirror field and being spaced axially from the central region thereof,
(f) an electrical power supply having a positive terminal connected to both said outer electrode and said center electrode and having a negative terminal connected to said field electrode,
(g) means for maintaining a vacuum within said outer electrode, and
(h) a fast opening valve disposed within said center electrode for emitting gas into said mirror field.

No references cited.